E. ROLKER.
CLUTCH.
APPLICATION FILED NOV. 3, 1915. RENEWED OCT. 30, 1920.
1,379,877.
Patented May 31, 1921.
2 SHEETS—SHEET 1.
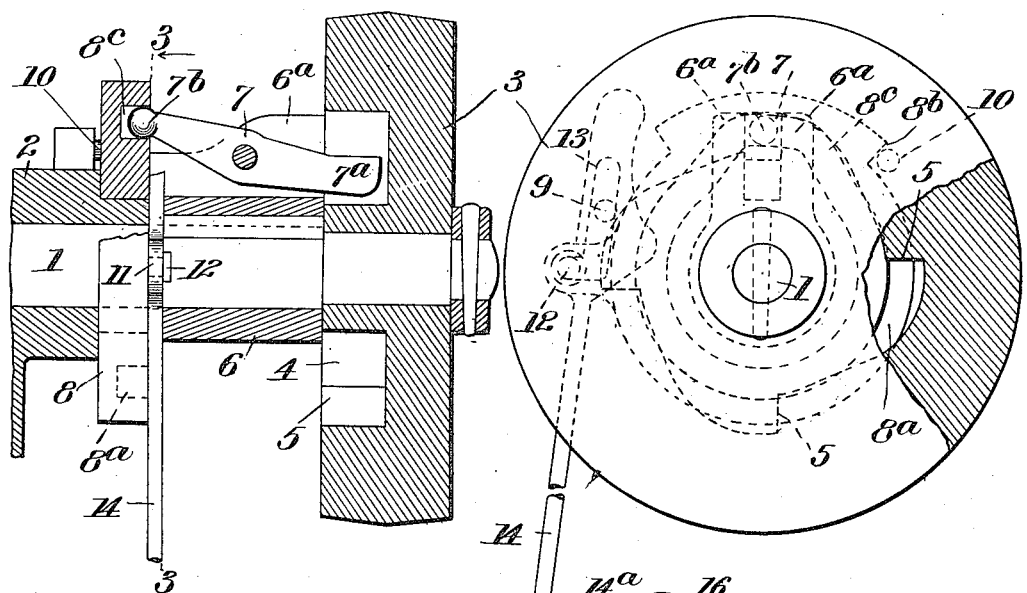
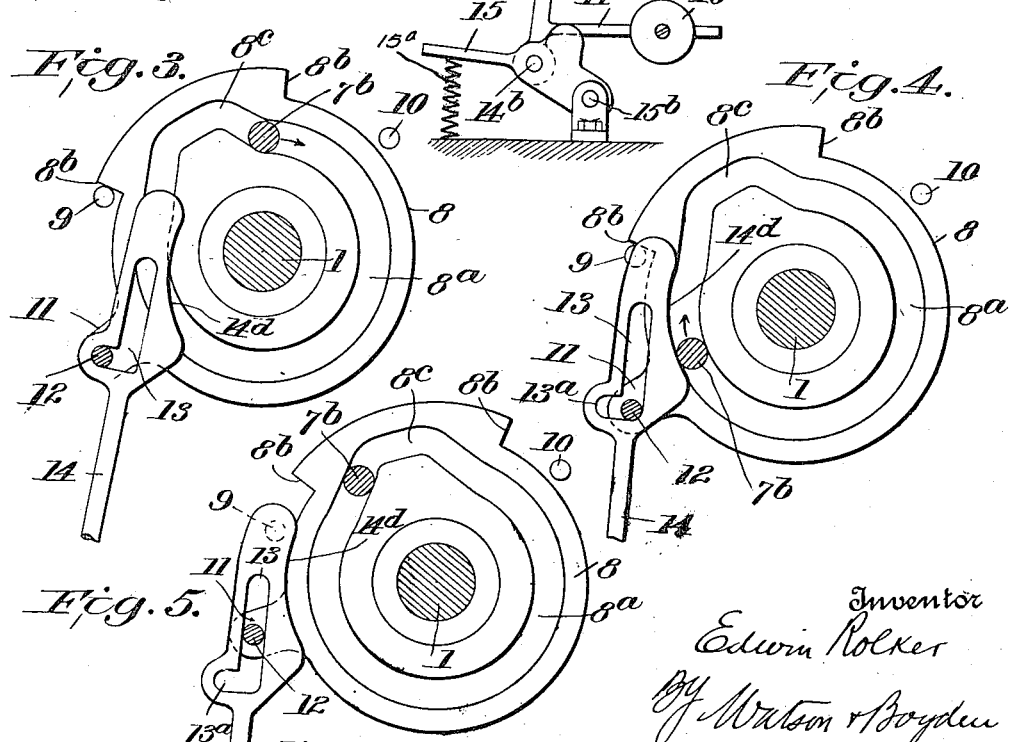

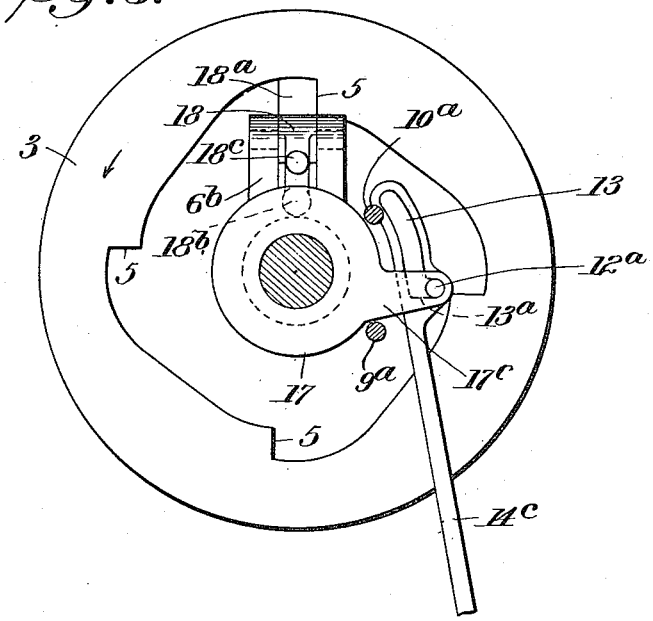
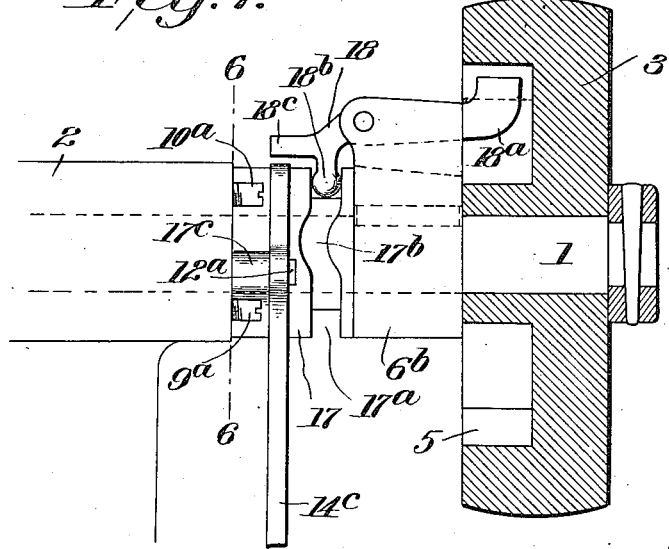

UNITED STATES PATENT OFFICE.

EDWIN ROLKER, OF BALTIMORE, MARYLAND.

CLUTCH.

1,379,877.  Specification of Letters Patent.  Patented May 31, 1921.

Application filed November 3, 1915, Serial No. 59,340. Renewed October 30, 1920. Serial No. 420,811.

*To all whom it may concern:*

Be it known that I, EDWIN ROLKER, a citizen of the United States, residing at Baltimore, in the State of Maryland, have invented certain new and useful Improvements in Clutches, of which the following is a specification.

The purpose of this invention is to provide a clutch which will automatically disengage itself at the completion of one revolution of the driven member of the clutch, and which cannot be operated more than once by a single manual operation of the tripping means.

In the accompanying drawing, which illustrates my invention,

Figure 1 is a central section through the clutch, in its preferred form, the section being taken on the line of the shaft on which the clutch is mounted;

Fig. 2 is a side elevation of the operating pedal and balance wheel, the latter partly in section, the clutch mechanism being principally shown in dotted lines;

Figs. 3, 4, and 5 are sections taken on the line 3—3 of Fig. 1, illustrating the operation of the clutch;

Fig. 6 is a section on the line 6—6 of Fig. 7; and,

Fig. 7 is a side elevation of a modified form of clutch, the balance wheel being shown in central section.

Referring to Figs. 1 to 5, inclusive, of the drawing, 1 indicates a shaft, such as the shaft of a wheel press, which is normally stopped, and which is revolved and stopped at the completion of each revolution, one of the bearings for the shaft being indicated at 2. Upon one end of the shaft is journaled a balance wheel 3, which is constantly driven by means of a belt, not shown. The inner face of the balance wheel is recessed, as indicated at 4, and provided with a plurality of internal shoulders 5. The balance wheel with its internal shoulders constitutes the driving member of the clutch. The coacting driven member of the clutch comprises a sleeve or collar 6, which is keyed to the shaft and provided with parallel, longitudinal ribs $6^a$, between which is mounted a centrally pivoted latch or lever 7, having one arm $7^a$ projecting into the recess 4 in the balance wheel, and having a spherical knob $7^b$ at its opposite end which projects into an annular groove $8^a$ in a cam disk 8, which is journaled on the stationary bearing 2. The disk is provided with shoulders $8^b$, adapted to engage stops 9 and 10 on the bearing 2 to limit the movement of the disk. The groove $8^a$ is concentric with the shaft, except at one point $8^c$ where it extends outward to form a cam.

On a lug 11, projecting from the periphery of the cam disk, is secured a pin 12 which engages a right angled slot 13, $13^a$, in a rod 14, connected pivotally to a pedal 15, at the point $14^b$. The rear end of the pedal is pivoted to a suitable support at $15^b$. The pedal and rod are normally held in an upper position by a spring $15^a$, and the upper end or head of the rod is normally pressed toward the shaft by a weight 16 on an arm $14^a$, which projects rearwardly from the rod 14, near the lower end of the latter. The part 13 of the slot in the rod extends longitudinally thereof for a distance somewhat greater than the vertical distance through which the rod is movable by the pedal, while the part $13^a$ of the slot, at the lower end of the part 13, is off-set far enough to receive the pin 12. The right angled slot and pin form a bayonet joint between the cam disk and the rod, by means of which these parts may be connected to move together, or released to allow independent movement. The rear edge of the rod, adjacent the slot, is curved in an arc of the same radius as the outer wall of the groove in the cam disk, as shown at $14^d$.

The parts are shown in their normal positions in Figs. 1 and 2, the cam disk resting against the stop pin 10, and the spherical end of the latch or lever 7 resting in the cam portion $8^c$ of the groove in the cam disk, the opposite end of the lever being thereby held out of engagement with the internal teeth in the balance wheel, and the operating rod being in its raised position with the pin 12 on the cam disk in the off-set portion of the slot in the rod.

In order to engage the clutch and operate the shaft, the operator bears down upon the pedal, and this causes the cam disk to rock into the position shown in Fig. 3, where its movement is stopped by the pin 9. This movement of the disk rocks the lever 7 so that its upper end $7^a$ is swung radially outward in the recess 4 into position to be engaged by one of the shoulders 5. When the lever has been thus engaged, the clutch member 6 and the shaft are rotated. The end $7^b$ of the latch travels with the clutch members in engagement with the groove in the cam disk in the direction indicated by the arrows in Figs. 3 and 4, the cam disk being stationary, and, during the last half of its revolution, the rod 14 being still held depressed by the operator, the latch engages the curved face $14^d$ on the rod and swings the rod forward, thus disengaging the pin 12 from the off-set or locking portion of the slot in the rod. Thereafter, the rod being still held in its depressed position by the operator, the end $7^b$ of the lever engages the cam portion of the groove in the disk, as shown in Fig. 5, and turns the disk backward until it is stopped by the pin 10, when said end of the lever rides on to the high portion of the cam and disengages the opposite end from the tooth or shoulder in the balance wheel, thus disconnecting the clutch members at the completion of one revolution. As the cam disk moves back to normal position, the pin 12 rides upward in the part 13 of the slot. After the clutch has been disengaged, the operator releases the rod, which is then moved upwardly by the spring $15^a$ and at the same time pressed rearwardly by the weight 16, and when the lower wall of the slot engages the pin 12, limiting the upward movement of the rod, the off-set portion of the slot engages the pin thus locking the rod to the disk so that the operation may be repeated by again bearing down upon the pedal.

It will be seen that the clutch will become automatically disengaged at the end of each revolution and that the operator cannot cause the machine to be operated a second time except by lifting his foot and allowing the pedal to rise so that the rod may interlock with the cam disk.

In the modification shown in Figs. 6 and 7, the cam member 17 is in the form of a sleeve journaled upon the shaft 1, and it is provided with an annular groove $17^a$ in a plane at right angles to the axis of the shaft and clutch members except at the point $17^b$, where the groove extends in a direction away from the clutch members to provide a cam surface. As in the previously described figures, the balance wheel 3 having internal shoulders 5 constitutes the driving member of the clutch, and is loosely mounted upon the shaft 1, while the driven member comprises a sleeve $6^b$, keyed to the shaft, and a lever 18, pivoted to the sleeve and extending longitudinally of the shaft and having one arm $18^a$ adapted to be engaged by the shoulders on the driving member. The opposite arm of the lever has a part $18^b$ turned radially inward and provided with a spherical end which engages the groove $17^a$, and it also has a projection $18^c$ extending beyond the line of the groove and adapted to engage the face of the operating rod $14^c$. This rod and the pedal may be substantially the same as the corresponding parts in the previously described figures. The sleeve 17 has an arm $17^c$, projecting from its periphery and provided with a pin $12^a$, adapted to engage the right angled slot 13, $13^a$, in the head of the rod. The arm $17^c$ is also adapted to engage stop pins $9^a$ and $10^a$ on the bearing 2, to limit the movement of the sleeve.

The operation of the device shown in Figs. 6 and 7 is substantially the same as that shown in Figs. 1 to 5, inclusive. The operator bears upon the pedal and moves the rod $14^c$ downward, thereby rocking the cam sleeve 17 until the latter is stopped by the pin $9^a$. This causes the lever 18 to be rocked into position to be engaged by the shoulders on the driving clutch member. The clutch being engaged, the shaft rotates and near the completion of one revolution, the projection $18^c$ on the latch or lever engages the inner edge of the head of the rod and moves the latter outward, causing the disengagement of the locking pin $12^a$ from the off-set portion of the slot in the head. Thereafter, the end $18^b$ of the lever, engaging the cam surface in the sleeve, rocks the latter back to normal position, against the stop $10^a$, and said end of the lever then rides on the high part of the cam groove and thereby rocks the lever out of engagement with the shoulder on the driving member, thus disengaging the clutch members. The operator then removes his foot from the pedal and the operating rod moves upwardly and rearwardly and the locking pin engages with the off-set part of the slot, ready for the next operation of the clutch.

In both forms of clutch shown in the drawing, if the operator should lift his foot from the pedal before the clutch has made a revolution, the rod would move up and return the cam to its normal position, and at the completion of the revolution the end of the latch or lever, which engages the groove in the cam, would rock the operating rod while passing the latter, but the rod would immediately swing rearwardly again and interlock with the pin. In no event can the clutch be operated more than once with a single depression of the operating rod. It will be noted that, in both forms of clutch, the engagement of the latch with the curved edge of the operating rod unlocks the pin from the off-set part of the slot, while the rod is depressed, and that the latch continues in engagement with the rod and holds the parts unlocked until after the latch has moved the cam member to carry the pin upward and out of register with the off-set part of the slot. Thus, the parts cannot interlock while the cam member and the latch are moving to their final positions, nor until the operator permits the rod to rise by lifting his foot from the pedal.

What I claim is:

1. In a clutch, driving and driven clutch members, a cam member adjustable independently of said members about their common axis and having an annular guideway provided with a cam, a latch on said driven member engaging said guideway and normally resting upon the cam portion thereof and adapted to be moved by said guideway into engagement with the driving member when the cam member is moved from normal position.

2. In a clutch, driving and driven clutch members, a cam member adjustable about the common axis of said clutch members and having an annular guideway provided with a cam, said driven member embodying a latch, pivotally mounted thereon, engaging said guideway and normally resting upon the cam portion thereof and adapted to be moved by said guideway into engagement with the driving member when the cam member is moved from normal position, and said latch adapted to reëngage the cam and return the cam member to normal position at the completion of a revolution of the driven member.

3. In a clutch, driving and driven clutch members, the latter comprising a latch for engaging the driving member, a cam member adjustable about the common axis of the driving and driven members and having an annular guideway provided with a cam, said latch engaging said guideway and normally held by said cam out of engagement with the driving member, an operating rod, normally locked to said cam member, for moving said member from normal position to disengage the cam from the latch and permit the latter to engage the driving member, said rod having a part adapted to be engaged and moved by a part on said driven member, near the completion of a revolution of the latter, to unlock the rod from the cam member and permit the latter to return to normal position.

4. In a clutch, driving and driven clutch members, a cam member adjustable about the common axis of said clutch members and having an annular guideway provided with a cam, an operating rod, normally locked to the cam member, for moving the same from normal position, said driven member embodying a latch engaging said guideway and normally held out of engagement with the driving member by said cam and adapted to be moved into engagement with the driving member by said cam when the cam member is moved from normal position, and to reëngage the cam and return the cam member to normal position at the completion of a revolution of the driven member.

5. In a clutch, driving and driven members, the latter embodying a latch for engaging the driving member, a cam member adjustable about the common axis of said members for operating said latch to engage and release the clutch, and an operating rod for moving the cam member, said rod having a normally locked bayonet-joint connection with said cam member and said driven member adapted to move the rod to unlock the rod near the completion of each revolution of the latter.

6. In a clutch, driving and driven clutch members, a cam adjustable about the common axis of said clutch members and having an annular cam groove, said driven member embodying a latch pivoted between its ends and having one arm engaging said groove and its opposite arm adapted to engage said driving member.

In testimony whereof I have affixed my signature.

EDWIN ROLKER.